Figures 1, 2:
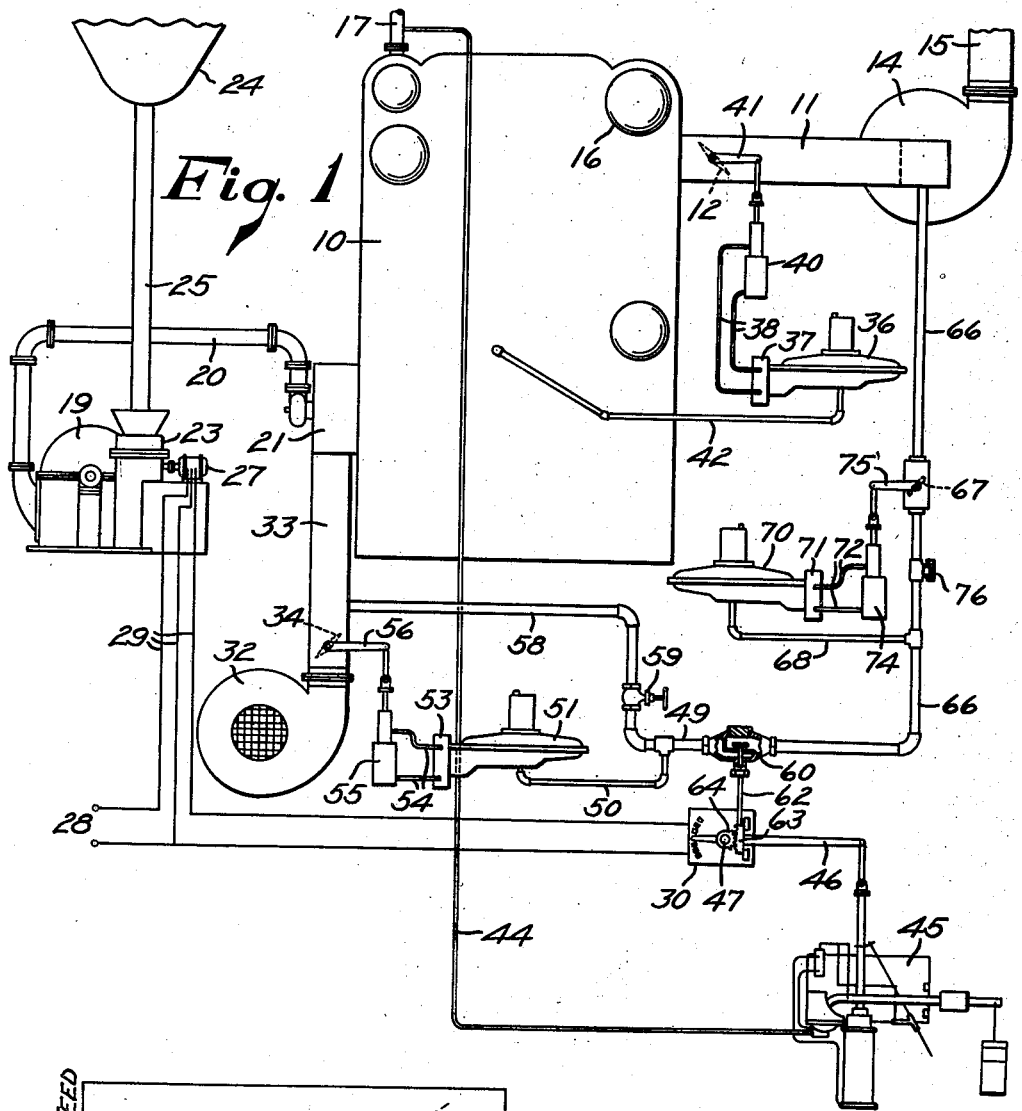

Sept. 14, 1937.  L. V ANDREWS  2,093,122
COMBUSTION CONTROL
Filed Oct. 25, 1934

RATE OF FUEL FEED
AIR FLOW AT BURNER

Inventor
L. V. ANDREWS
By Albert G. Blodgett
Attorney

Patented Sept. 14, 1937

2,093,122

UNITED STATES PATENT OFFICE 2,093,122

COMBUSTION CONTROL

L. V. Andrews, Worcester, Mass., assignor to Riley Stoker Corporation, Worcester, Mass., a corporation of Massachusetts Application October 25, 1934, Serial No. 749,988

19 Claims. (Cl. 236—14)

This invention relates to combustion control, and more particularly to a method and apparatus for controlling the rate of combustion in accordance with the demand for heat, while maintaining the desired ratio between the quantities of fuel and air supplied.

Certain fuels, such as pulverized coal, are burned in suspension in a furnace, and the air required for combustion is ordinarily supplied under forced draft. It has been proposed heretofore to control the air supply automatically by regulating apparatus responsive to the forced draft pressure and the demand for heat. Since the rate of air flow varies as the square root of the pressure, whereas the fuel supply is varied in direct proportion to the demand for heat, it has been necessary to provide cams or equivalent devices to ensure the correct fuel-air ratio throughout the operating range. Such cams are difficult to design and install with sufficient accuracy, and it is frequently necessary for an expert to spend considerable time at a new installation in making the adjustments required. This problem is rendered more serious by reason of the fact that large steam-generating furnaces cannot ordinarily be operated at any particular rating desired for convenience in adjusting the combustion control apparatus. On the contrary, the rating is dictated solely by the available load, and much time may be wasted in waiting for the load to change to that at which it is desired to make adjustments.

It is accordingly one object of the invention to provide a method of controlling combustion which will avoid these difficulties, and which will make possible the maintenance of a desired fuel-air ratio throughout the operating range with a minimum of preliminary adjustments.

It is a further object of the invention to provide comparatively simple and inexpensive combustion control apparatus which will automatically compensate for the square-root relationship between air flow and air pressure, so that the air flow may be controlled in direct proportion to the fuel supply.

It is a further object of the invention to provide combustion control apparatus which can be readily adjusted to bring about the correct fuel-air ratio at any given rating at which the furnace may happen to be operating, and which will thereafter maintain this ratio irrespective of changes in rating throughout the operating range.

It is a further object of the invention to provide combustion control apparatus which will automatically ensure a directly proportionate relationship between air flow and fuel supply without the use of cams.

With these and other objects in view, as will be apparent to those skilled in the art, the invention resides in the combination of parts and the steps of the process set forth in the specification and covered by the claims appended hereto.

In accordance with my invention in its preferred form, I regulate the rate of fuel feed in response to variations in the demand for heat, and I regulate the air flow to the furnace in accordance with the pressure in a control chamber. This control chamber is supplied with air from the main air supply through a restricted passage, and the air escapes from the chamber through a restriction which is varied in accordance with the demand for heat. The rate of air flow through the control chamber is preferably varied in direct proportion to the rate of fuel feed.

Referring to the drawing illustrating one embodiment of the invention, and in which like reference numerals indicate like parts, Fig. 1 is a somewhat diagrammatic elevation of a combustion control system applied to a steam generating furnace; and Fig. 2 is a chart showing the relationship between the rate of fuel feed and the rate of air flow.

The embodiment illustrated comprises a furnace 10 having a gas outlet or uptake 11 provided with a damper 12. The uptake 11 is connected to an induced draft fan 14 having a discharge duct 15 which may lead to a suitable stack (not shown). It will be apparent that if the stack provides sufficient draft the fan may be omitted. Associated with the furnace is a water tube steam boiler 16 of suitable construction provided with a steam delivery pipe 17. The furnace is arranged for firing with pulverized coal, and for this purpose I have shown a suitable pulverizer 19 having its delivery pipe 20 connected to a burner 21 on the wall of the furnace. The pulverizer is provided with a regulatable feeding mechanism 23 which is supplied with coarse coal from an overhead bunker 24 through a downspout 25. The feeding mechanism 23 is driven by a variable-speed electric motor 27 which is supplied with electric current from a source 28 by means of wires 29. A rheostat 30 is connected into the electrical circuit to control the motor speed, and this rheostat is preferably of a type which will provide equal changes in motor speed for equal movements of the rheostat. The air required for combustion is supplied by a forced draft fan 32 which is connected to the burner 21 by means of a duct 33. This duct is provided with a damper 34.

The pressure within the furnace 10 is preferably maintained substantially constant by suitable automatic control of the uptake damper 12. For this purpose I have shown an automatic regulator 36 of the type disclosed in the patent to Temple, No. 1,992,048, granted February 19, 1935. This regulator comprises a pilot valve mechanism 37 connected by pipes 38 with a hydraulic motor 40 which serves to actuate the operating arm 41 of the damper 12. The regulator is connected to the interior of the furnace by means of a pipe 42.

The rate of coal feed to the pulverizer is regulated in accordance with the demand for heat. As an indication of the demand for heat I preferably utilize the pressure of the steam. This pressure is transmitted from the pipe 17 through a pipe 44 to a steam pressure regulator 45, which is preferably of the compensating type. One suitable construction is disclosed in the patent to Temple No. 1,890,472, granted December 13, 1932. This regulator is connected to an operating arm 46 which is secured to the shaft 47 of the rheostat 30.

The air flow to the burner 21 is regulated in accordance with the pressure in a control chamber 49 which may be conveniently constructed of pipe. The pressure in this chamber is transmitted through a pipe 50 to an automatic regulator 51, which may be similar to the regulator 36. This regulator 51 comprises a pilot valve mechanism 53 connected by pipes 54 with a hydraulic motor 55 which serves to actuate the operating arm 56 of the forced draft damper 34.

The control chamber 49 is supplied with air from the forced draft duct 33 through a pipe 58 having a restriction therein. The restriction is preferably adjustable, and for this purpose I have shown a suitable valve 59 which can be controlled manually if desired. The air escapes from the control chamber through a restricted passage or discharge opening which is adjusted in accordance with the demand for heat. This restricted passage may be provided by a valve 60, which is preferably of a type which will afford uniform changes in flow area for uniform changes in valve position. The operating stem 62 of the valve 60 is attached to a rack 63 which meshes with a pinion 64 secured to the rheostat shaft 47. It will be apparent that with this arrangement the flow area of the valve 60 will be in direct proportion to the angular adjustment of the rheostat and hence to the rate of coal feed to the pulverizer.

The valve 60 is arranged to discharge into a zone of substantially constant pressure, and for this purpose I may utilize the atmosphere. However, for reasons which will appear hereinafter, it is desirable to maintain the pressure in the control chamber 49 slightly below atmospheric. This necessitates the maintenance of a zone at a still lower pressure at the discharge of the valve 60 so that flow may occur through the control chamber. Such a zone may be provided by connecting the valve 60 to the uptake 11 by means of a pipe 66 provided with a butterfly valve 67. The pressure anterior to the valve 67 is transmitted through a pipe 68 to an automatic regulator 70, which may be similar to the regulator 36. This regulator 70 comprises a pilot valve mechanism 71 connected by pipes 72 with a hydraulic motor 74 which serves to actuate the operating arm 75 of the valve 67. A small vent 76 preferably leads into the pipe 66 between the valves 60 and 67, so that sufficient air may enter the pipe to ensure accurate pressure control by the regulator 70 even when the valve 60 may be substantially closed.

The regulator 36 is preferably adjusted to maintain the pressure within the furnace 10 substantially constant at a value slightly below that of the atmosphere, say —.1 inch water column. The regulator 51 is preferably adjusted to maintain substantially the same pressure in the control chamber 49. The regulator 70 is adjusted to maintain a slightly lower pressure, say —.2 inch water column, at the discharge side of the valve 60.

It will now be apparent that under steady load conditions the master regulator 45 will remain stationary, holding the rheostat 30 in the proper position to maintain the fuel feed at the value necessary to ensure the desired rate of steam generation. At the same time the master regulator will hold the valve 60 in a position to maintain a predetermined flow area for the discharge of air from the control chamber 49. The regulator 51 will hold the damper 34 in the position necessary to provide a definite forced draft pressure. This pressure will be that required to deliver air past the restriction 59 and maintain the correct pressure in the control chamber. If the demand for steam should increase, the steam pressure will drop slightly and the master regulator 45 will assume a new position, readjusting the rheostat 30 to bring about an increased rate of fuel feed to correspond with the increased demand. At the same time the master regulator will open the valve 60, increasing the flow of air through the control chamber. This will tend to decrease the pressure in the control chamber and the regulator 51 will immediately open the damper 34 further and increase the forced draft pressure sufficiently to restore the predetermined control chamber pressure. A decrease in the demand for heat will cause the various parts to be adjusted in the opposite direction. Regardless of load variations, the regulators 36 and 70 will maintain the desired pressures in the furnace 10 and at the discharge of the valve 60 respectively.

Since the pressures at the inlet and outlet of the valve 60 are held substantially constant, it will be apparent that the rate of air flow through the valve will be directly proportional to the valve opening. Moreover, the flow through the restriction 59 will be the same as that through the valve 60, and the pressure drop through the restriction 59 will be directly proportional to the square of the rate of flow, in accordance with well-known laws. The rate of air flow through the burner 21 will vary directly as the square-root of the pressure difference between the forced draft duct 33 and the furnace chamber 10, and if the pressure in the furnace chamber is substantially the same as that in the control chamber 49 it follows that the burner air flow will be directly proportional to the air flow through the control chamber. Consequently, by varying the opening of the valve 60 in direct relation to the adjustment of the rheostat 30, I am able to maintain the rate of air flow at the burner in direct proportion to the rate of fuel feed, as indicated by the straight line 80 on the chart of Fig. 2. In other words, the fuel-air ratio will remain fixed throughout the operating range, and if this ratio is adjusted correctly for any one load it will remain the same no matter how the load may vary.

There are at least two ways in which the fuel-air ratio may be changed manually if necessary to bring about the correct combustion conditions. This change can be effected by adjusting the valve 59 to vary the amount of restriction, or by adjusting the regulator 70 to vary the pressure at the discharge side of the valve 68. Either of these adjustments will vary the rate of air flow through the burner without affecting the fuel feed. On the chart of Fig. 2 a change in fuel-air ratio would be shown by a change in the slope of the line 89, as indicated by the broken lines.

From the above it will be apparent that my improved combustion control system can be installed and adjusted to bring about the correct fuel-air ratio at any load at which it may be convenient to operate the boiler. The correct ratio can be determined by a measurement of the $CO_2$ content of the flue gases, in a well known manner. Once this initial adjustment is made, the ratio will be maintained automatically irrespective of variations in the load. It is necessary to adjust for one load only. The control apparatus automatically ensures a directly proportionate relationship between air flow and fuel supply without the use of cams, and the cost and difficulty of adjustment are greatly reduced.

Having thus described my invention, what I claim as new and desire to secure by Letters Patent is:

1. The method of controlling combustion in a forced draft furnace which comprises allowing a comparatively small stream of air to escape from the forced draft supply to a zone of lower pressure, regulating both the fuel supply and the rate of flow of said stream in accordance with the demand for heat, and regulating the forced draft supply in accordance with pressure characteristics of said stream.

2. The method of controlling combustion in a forced draft furnace which comprises allowing a comparatively small stream of air to escape from the forced draft supply to a zone of lower pressure, regulating the fuel supply in accordance with the demand for heat, regulating the rate of flow of said stream in direct proportion to the rate of fuel supply, and regulating the forced draft supply in accordance with pressure characteristics of said stream.

3. The method of controlling combustion in a forced draft furnace which comprises allowing a restricted flow of air from the forced draft supply to a zone of lower pressure, regulating the forced draft supply in accordance with the pressure of the air in said zone, allowing air to discharge from said zone, and regulating both the fuel supply and the discharge of air from the zone in accordance with the demand for heat.

4. The method of controlling combustion in a forced draft furnace which comprises allowing a restricted flow of air from the forced draft supply to a zone of lower pressure, regulating the forced draft supply to maintain the pressure of the air in said zone substantially constant, allowing air to discharge from said zone, and regulating both the fuel supply and the discharge of the air from the zone in accordance with the demand for heat.

5. The method of controlling combustion in a forced draft furnace which comprises allowing a restricted flow of air from the forced draft supply to a zone of lower pressure, regulating the forced draft supply in accordance with the pressure of the air in said zone, allowing air to discharge from said zone to a second zone in which the pressure is substantially constant, and regulating both the fuel supply and the discharge of the air from the first mentioned zone in accordance with the demand for heat.

6. The method of controlling combustion in a forced draft furnace which comprises allowing a restricted flow of air from the forced draft supply to a zone of lower pressure, regulating the forced draft supply to maintain the pressure of the air in said zone substantially constant, allowing air to discharge from said zone to a second zone in which the pressure is substantially constant, and regulating both the fuel supply and the discharge of the air from the first mentioned zone in accordance with the demand for heat.

7. The method of controlling combustion in a forced draft furnace which comprises allowing a restricted flow of air from the forced draft supply to a zone of lower pressure, regulating the forced draft supply to maintain the pressure of the air in said zone substantially constant, allowing air to discharge from said zone to a second zone in which the pressure is substantially constant, regulating the fuel supply in accordance with the demand for heat, and regulating the rate of discharge of air from the first mentioned zone in direct proportion to the rate of fuel supply.

8. The method of controlling combustion in a forced draft furnace which comprises allowing a restricted flow of air from the forced draft supply to a zone of lower pressure, maintaining a substantially constant pressure in the furnace, regulating the forced draft supply to maintain the pressure of the air in said zone substantially equal to the pressure in the furnace, allowing air to discharge from said zone to a second zone in which the air is at a substantially constant pressure lower than the furnace pressure, and regulating both the fuel supply and the discharge of the air from the first mentioned zone in accordance with the demand for heat.

9. A combustion control system for a forced draft furnace comprising means providing a restricted passage leading from the forced draft air supply to a zone of lower pressure, means to regulate both the fuel supply and the rate of flow of air in said passage in accordance with the demand for heat, and means to regulate the forced draft supply in accordance with pressure characteristics of the air in said passage.

10. A combustion control system for a forced draft furnace comprising means providing a restricted passage leading from the forced draft air supply to a zone of lower pressure, means to regulate the fuel supply in accordance with the demand for heat, means to regulate the rate of flow of air in said passage in direct proportion to the rate of fuel supply, and means to regulate the forced draft supply in accordance with pressure characteristics of the air in said passage.

11. A combustion control system for a forced draft furnace comprising a control chamber having a discharge opening, means providing a restricted passage connecting the forced draft air supply with the control chamber, means to regulate the air flow to the furnace in accordance with the pressure in the control chamber, and means to regulate both the fuel supply and the discharge of air from the control chamber in accordance with the demand for heat.

12. A combustion control system for a forced draft furnace comprising a control chamber having a discharge opening, means providing a restricted passage connecting the forced draft air supply with the control chamber, means to regulate the air flow to the furnace in accordance with the pressure in the control chamber, a valve to control the discharge of air from the control chamber, and means to regulate both the fuel supply and the valve in accordance with the demand for heat.

13. A combustion control system for a forced draft furnace comprising a control chamber having a discharge opening, means providing a restricted passage connecting the forced draft air supply with the control chamber, means to regulate the air flow to the furnace in accordance with the pressure in the control chamber and maintain said pressure substantially constant, and means to regulate both the fuel supply and the discharge of air from the control chamber in accordance with the demand for heat.

14. A combustion control system for a forced draft furnace comprising a control chamber having a discharge opening, means providing a restricted passage connecting the forced draft air supply with the control chamber, means to maintain a substantially constant pressure in the furnace, means to regulate the air flow to the furnace in accordance with the pressure in the control chamber and maintain said pressure substantially equal to the furnace pressure, and means to regulate both the fuel supply and the discharge of air from the control chamber in accordance with the demand for heat.

15. A combustion control system for a forced draft furnace comprising a control chamber having a discharge opening, means providing a restricted passage connecting the forced draft air supply with the control chamber, means to regulate the air flow to the furnace in accordance with the pressure in the control chamber and maintain said pressure substantially constant, an adjustable valve to control the discharge of air from the control chamber to a zone of constant pressure, and means to regulate both the fuel supply and the valve in accordance with the demand for heat.

16. A combustion control system for a forced draft furnace having a gas outlet passage comprising a control chamber, means providing a restricted passage connecting the forced draft air supply with the control chamber, means to maintain a substantially constant pressure in the furnace, means to regulate the air flow to the furnace in accordance with the pressure in the control chamber and maintain said pressure substantially equal to the furnace pressure, a conduit connecting the control chamber with the gas outlet passage, a valve controlling the delivery of air from the control chamber to the conduit, means to regulate both the fuel supply and the valve in accordance with the demand for heat, a valve in the conduit, and means to regulate the last mentioned valve and maintain a substantially constant pressure in the conduit between the valves.

17. A combustion control system for a forced draft furnace having a gas outlet passage comprising a control chamber, means providing a restricted passage connecting the forced draft air supply with the control chamber, means to regulate the flow of gases through the outlet passage in accordance with the pressure in the furnace and maintain said pressure substantially constant, means to regulate the air flow to the furnace in accordance with the pressure in the control chamber and maintain said pressure substantially equal to the furnace pressure, a conduit connecting the control chamber with the gas outlet passage, a valve controlling the delivery of air from the control chamber to the conduit, means to regulate both the fuel supply and the valve in accordance with the demand for heat, a valve in the conduit, and means to regulate the last mentioned valve in accordance with the pressure in the conduit between the valves and maintain said pressure substantially constant, the conduit between the valves having a comparatively small vent connecting its interior with the atmosphere.

18. A combustion control system for a forced draft furnace comprising a control chamber having a discharge opening, means providing a restricted passage connecting the forced draft air supply with the control chamber, means to regulate the air flow to the furnace in accordance with the pressure in the control chamber, a valve to control the discharge of air from the control chamber, means to regulate the fuel supply in accordance with the demand for heat, and means to adjust the valve automatically and maintain the flow area thereof in direct proportion to the rate of fuel supply.

19. A combustion control system for a forced draft furnace comprising a control chamber having a discharge opening, a passage connecting the forced draft air supply with the control chamber, an adjustable valve in the passage, means to regulate the air flow to the furnace in accordance with the pressure in the control chamber, and means to regulate both the fuel supply and the discharge of air from the control chamber in accordance with the demand for heat.

L. V. ANDREWS.